United States Patent [19]

Johnson

[11] Patent Number: 4,752,300

[45] Date of Patent: Jun. 21, 1988

[54] DYEING AND FIRE RETARDANT TREATMENT FOR NOMEX

[75] Inventor: James R. Johnson, McLeansville, N.C.

[73] Assignee: Burlington Industries, Inc., Greensboro, N.C.

[21] Appl. No.: 871,389

[22] Filed: Jun. 6, 1986

[51] Int. Cl.$^4$ .............................................. C09B 67/00
[52] U.S. Cl. ..................................... 8/584; 106/18.19; 427/393.3; 8/925
[58] Field of Search .................... 8/584; 106/18.19; 427/393.3

[56] References Cited

U.S. PATENT DOCUMENTS

| | | | |
|---|---|---|---|
| 3,511,857 | 5/1970 | Baranauckas et al. | 260/347.8 |
| 3,527,557 | 8/1970 | Cheape et al. | 8/100 |
| 3,565,572 | 2/1971 | Schneider et al. | 8/171 |
| 3,749,600 | 7/1973 | Bergman et al. | 8/90 |
| 3,789,091 | 1/1974 | Anderson | 260/927 R |
| 3,849,368 | 11/1974 | Anderson | 260/45.8 R |
| 3,950,129 | 4/1976 | Friedman et al. | 8/17 |
| 3,991,019 | 11/1976 | Shim | 260/2.5 AJ |
| 4,113,429 | 9/1978 | Kruse et al. | 8/90 |
| 4,139,476 | 2/1979 | Hancock | 427/352 |
| 4,237,157 | 12/1980 | Hancock | 427/352 |
| 4,314,052 | 2/1982 | Engelhardt et al. | 528/287 |
| 4,397,759 | 8/1983 | Hancock | 252/609 |

OTHER PUBLICATIONS

Albright & Wilson Product Data Sheet.
Albright & Wilson Material Safety Data Bulletin.

*Primary Examiner*—A. Lionel Clingman
*Assistant Examiner*—John F. McNally
*Attorney, Agent, or Firm*—Nixon & Vanderhye

[57] ABSTRACT

Poly(m-phenyleneisophthalamide) fibers are simultaneously dyed and imparted improved flame retardant properties with a fire retardant liquid in which a disperse or acid dye is dissolved. Fabrics thus dyed and FR treated exhibit no afterglow when exposed to an open flame and a Limiting Oxygen Index greater than their undyed counterparts.

13 Claims, No Drawings

DYEING AND FIRE RETARDANT TREATMENT FOR NOMEX

This invention relates to the concurrent dyeing and fire-retardant treatment of Nomex, preferably in fabric form, and is specific to the use of cyclic phosphonate esters having fire retardant properties. These esters serve to swell the Nomex fiber and allow for introduction of a dyestuff into the fiber.

BACKGROUND OF THE INVENTION

The aramid fiber Nomex has several interesting and indeed unique properties that make it highly desirable for specific applications. As an example, the fiber is inherently flame retardant, and thus lends itself to applications in which such fire retardant properties are desirable. Aramid fibers are extremely hard to dye, due, in part, to the crystallinity of the fiber. Solution-dyed aramid fibers are available but only in limited colors as selected by the fiber manufacturer. Frequently dye carriers such as acetophenone have been used to effectively dye such fibers. However, these carriers may themselves be flammable or detract from the otherwise good inherently flame retardant properties of the fiber. In addition, acetophenone dyed products have a rather characteristic odor that is not well accepted. Dyes introduced into the fiber and/or topical finishes and chemicals applied to the fiber affect the fire retardant characteristics of the final product.

Observations with respect to the fire retardant properties, or lack thereof, for Nomex fibers are similar to those noted in the dyeing and finishing of glass fabrics. While glass fibers will not themselves support combustion, the pigments, dyes or other finishes applied to glass fabrics will burn. Glass fabric forms a convenient matrix to support the pigments, dyes or finish, and this matrix provides a relatively large surface area and allows flame to propagate. A similar situation occurs with Nomex fabrics and thus, as with glass fabrics, it is sometimes necessary to add an auxiliary fire retardant chemical to the finish to improve the overall fire retardant characteristics of the final Nomex product.

It is therefore an object of this invention to both dye and fire retard aramid fibers, specifically Nomex, in a single step and to provide a product that has fire retardant qualities that are at least as good as, if not better than, undyed, greige Nomex fabric. The invention includes the application of a fire retardant material or fire retardant system together with a disperse dye or an acid dye (anionic dye) to a aramid fiber in the form of a staple, tow, or yarn; woven, non-woven, circular knitted, or tricot knitted fabrics; crimped, texturized, flocked, or tufted textiles; but preferably in the form of a woven fabric. The acid or disperse dye may be applied to the fibers using any convenient process; however (1) a pad/thermosol process, (2) a print paste process, or (3) immersion of the fibers into a neat, heated solution of fire retardant plus dyestuff gives the best results.

Candidate fibers for the dyeing and fire retardant process of this invention are known generally as aromatic polyamides or "aramids". This class includes a wide variety of polymers as disclosed in U.S. Pat. No. 4,324,706, the disclosure of which is incorporated by reference. Experience indicates that for some reason not fully understood, not all types of aramid fibers can be reproducibly treated by this process; those fibers that are not suited do not allow the disperse or acid dye to enter the fiber and are only surface stained. Thus, a fiber amenable to the process of this invention is selected from the class of aramids suitable for dyeing and fire retarding. Such fibers are referred to here as treatable, i.e., dyeable and fire-retardant treatable aramids, the best known being the polymer known chemically as poly(m-phenyleneisophthalamide), i.e., the meta isomer which is the poly condensation product of m-phenylenediamine and isophthalic acid. Below is a listing of fibers now commercially available identified by fiber name (usually a trademark) and producer:

| Fiber Name | Producer |
| --- | --- |
| Nomex | DuPont |
| Apyeil (5207) | Unitika |
| Apyeil-A (6007) | Unitika |
| Conex | Teijin |

Selection of a suitable aramid amenable to the continuous dyeing and fire retarding process of this invention can be conveniently made by subjecting a fiber sample to an abbreviated test to determine fiber acceptability. Experience indicates that fibers of the para isomer, poly(p-phenyleneterephthalamide), represented commercially by duPont's Kevlar and Enka-Glanzstoff's Arenka, as well as Rhone-Poulenc's Kermel and polybenzimidazole (PBI), are merely stained or changed in color but are not dyed by the process of this invention. Accordingly, as used in the text of this application and in the claims that follow, the expressions "aramid" and "aromatic polyamide fiber", when pertaining to the novel process of this invention, will signify the meta isomer. Blends of poly(m-phenyleneisophthalamide) fibers with other fibers, including fibers of the para isomer, may be subjected to the dyeing process in which case only the meta isomer fibers will be dyed.

The fire retardant materials used in the process of this invention do not degrade and successfully withstand heat treatment at temperatures over 300° F., and are typically liquid at such temperatures. Among the types of materials that may be employed, preferred are the cyclic phosphonate esters described, for instance, in one or more of U.S. Pat. Nos. 3,894,386, 3,149,476, 3,991,019 and 3,511,857.

The fire retardant materials used in accordance with the present invention are thermally stable cyclic phosphonate esters prepared by reacting alkyl-halogen-free esters with a bicyclic phosphite. As a class these cyclic phosphonate esters are represented by one of the formulas:

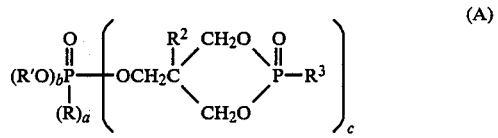
(A)

where a is 0 or 1; b is 0, 1 or 2, c is 1, 2 or 3 and a+b+c is 3; R and R' are the same or different and are alkyl ($C_1$–$C_8$), phenyl, halophenyl, hydroxyphenyl, tolyl, xylyl, benzyl, phenethyl, hydroxyethyl, phenoxyethyl, or dibromophenoxymethyl; $R^2$ is alkyl (C–$C_4$); and $R^3$ is lower alkyl ($C_1$–$C_4$) or hydroxyalkyl ($C_1$–$C_4$) or

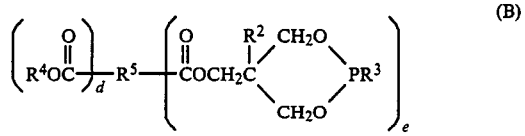

where d is 0, 1 or 2; e is 1, 2 or 3; $R^2$ is alkyl ($C_1$-$C_4$); $R^3$ is lower alkyl ($C_1$-$C_4$) or hydroxyalkyl phenyl, halophenyl, hydroxyphenyl, hydroxyethyl, phenoxyethyl, dibromophenoxyethyl, tolyl, xylyl benzyl, or phenethyl; and $R^5$ is monovalent alkyl ($C_1$-$C_6$), chlorophenyl, bromophenyl, dibromophenyl, tribromophenyl, hydroxyphenyl, naphthyl, tolyl, xylyl, benzyl, or phenethyl; divalent alkylene ($C_1$-$C_6$), ylene, o-phenylene, m-phenylene, p-phenylene, tetrachlorophenylene (o, m, or p), or tetrabromophenylene (o, m, or p); or trivalent phenenyl.

The preferred compounds are represented by the formula:

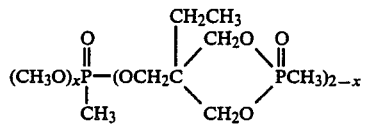

in which x is 0 or 1, usually a 50:50 mixture of the mono and di-esters. The preparation of these cyclic phosphonate esters and their use as flame retardants are described in U.S. Pat. Nos. 3,789,091 and 3,849,368, the disclosures of which are hereby incorporated by reference.

The 50:50 mixture of these esters is available as Antiblaze 19 (sometimes AB 19 herein) from Albright & Wilson, Inc., of Richmond, Va. Also available is Antiblaze 19T, a low viscosity grade flame retardant containing 93% active ingredient and formulated especially for textile treating requirements. As described by the supplier, Antiblaze 19 has a flash point of 464° F. (240° C.), and 19T a flash point of 459° F. (237° C.) by the Cleveland open cup method; both are suited for application as high temperatures.

An essential part of the present invention is heating the fibers in the presence of both the dyestuff (disperse or acidic) plus the fire retardant liquid. Treatment temperatures in the range of 300-600° F. are contemplated. However, higher and lower temperatures may be employed depending upon the specific heat characteristics of the aromatic polyamide fiber being treated, heat tolerance of the dyestuff itself, and the nature of the fire retardant liquid. Heating is generally in the range of about 350° F. to about 390° F. and for a period of time sufficient to impart the desired fire retardant characteristics to the fiber as well as to introduce a sufficient quantity of dyestuff into the fiber. Exposure times range from periods as short as 10 seconds up to 2 minutes or longer, depending upon the processing conditions and the equipment employed.

Dyestuff-containing compositions and fire-retardant treatments are detailed below.

The pad/thermosol process. A solution of "neat" (undiluted) fire retardant containing the desired quantity of disperse or acid dye is padded onto the fibers at ambient temperatures, then heat treated in order to "fix" the dyestuff to the fiber and provide the required fire-retardant treatment. Following this, the fibers are washed with an aqueous detergent (scoured) then given a rinse in a halogenated hydrocarbon, for instance perchloroethylene.

Print pastes. A paste of disperse dyestuff is made with the liquid fire-retardant material, and this water-free paste is then applied to the aramid fabrics to be treated either in a uniform manner, such as with a doctor knife, nip roll or the like, or in a predetermined pattern on a printing machine. Heat is applied in order to fix the dyestuff to the fiber and accomplish the required fire retardant treatment, and this is followed by an aqueous detergent scour and a rinse in a halogenated hydrocarbon.

Immersion in hot fluid. Successful dyeing and fire retardant treatment may be accomplished by immersing the fibers, typically in fabric form, into a bath containing the fire retardant material in which the requisite quantity of disperse or acid dye has been dissolved. When Antiblaze 19 is used as the fire retardant liquid, the dyestuff solution is maintained at a temperature in the range of about 350 to 380° F., and the fibers are exposed to the heated solution for various periods of time ranging from as little as 15 seconds up to about 2 minutes. This immersion is followed by an aqueous detergent scour and then rinsing with a halogenated hydrocarbon.

While not wishing to be bound by any theory or mode of operation, it would appear that a suitable fire retardant acts both as a solvent or a vehicle for dyeing the fiber and causing the fiber itself to swell, thus allowing the disperse or acid dye to enter into the fibers. In addition, it appears that the dyeing mechanism is an equilibrium condition between the fiber and the fire-retardant fluid—the greater the solubility of the dye in the fire-retardant liquid, the less the "solubility" of the dye in the fiber. The dye yield thus depends upon solubility of the dye in the fire retardant fluid.

The process of the present invention makes it possible to both dye and improve the fire retardant characteristics of aramid fibers using either acid dyes or disperse dyes with the minimum number of steps, at a rapid rate of treatment and on existing equipment. The dyes can be applied by a pad/thermosol process, immersion in the hot fire-retardant fluid containing the dye, or by incorporating the fire-retardant fluid into a print paste and printing the fabric. The fire-retardant fluid may also contain an organic solvent swelling agent to assist in swelling the aramid fiber and thus facilitate introduction of the dyestuff and flame-retardant into the fiber. Such swelling agents include N-methylpyrrolidone, dimethylsulfoxide (DMSO) and dimethylacetamide.

Flame Retardancy Tests

The processes of the present invention are capable of imparting desirable flame-retardant properties to the material being treated so that the fabric will at least meet the standards established by the requisite review or governmental authority. A host of such tests are given in U.S. Pat. No. 4,120,798. However, those more specific to aramid fibers, and in particular Nomex, are NFPA 701, FTM 5903 and FTM 5905. Significant is the fact that the product produced by the process of this invention does not exhibit afterglow following exposure to open flame. By contrast, most aramid fibers have an afterglow of about 12 seconds following exposure to open flame. This afterglow is a critical factor because it will support combustion if combustible gases are also present. In addition, Nomex fabrics treated in accordance with the present invention perform better in most tests than the undyed (greige) fabrics. Treated fabrics submitted to testing exhibit a minimum shrinkage when exposed to open flame, do not support combustion when removed from the open flame and do not exhibit afterglow. By contrast, unfinished Nomex fabrics continue to burn for several seconds after being removed from flame and there is some afterglow present; unfinished Nomex samples also shrink considerably.

Fire retardancy testing procedures and methods are explained in more detail below. From these tests it will be apparent that the simultaneous dyeing and fire-retardant treatment of the present invention improves the burning characteristics of aramid fibers, specifically Nomex fabric. In addition, testing indicates that the finish is durable, many samples retaining desirable properties after the equivalent of 50 home launderings in a washing machine.

One specific test of importance is the Limiting Oxygen Index (LOI), determined according to ASTM Method D-2863-77, which is an expression of the percent of oxygen needed to support combustion on a sample (see below). For greige Nomex fabric, the LOI value is 26.6%. The same Nomex fabric but dyed and fire retardant treated in accordance with the process of the current invention has a LOI value of 39% for oxygen. Untreated PBI (another fiber that is inherently flame retardant) exhibits a LOI of 41%.

FR Federal Test Method 5903 is intended for use in determining the resistance of cloth to flame and glow propagation and tendency to char. A rectangular cloth test specimen (70 mm×120 mm) with long dimension parallel to the warp or fill direction is placed in a holder and suspended vertically in a cabinet with the lower end ¾ inch above the top of a Fisher gas burner. A synthetic gas mixture consisting primarily of hydrogen and methane is supplied to the burner. After the specimen is mounted in the cabinet and the door closed, the burner flame is applied vertically at the middle of the lower edge of the specimen for 12 seconds. The specimen continues to flame after the burner is extinguished. The time is seconds the specimen continues to glow after the specimen has ceased to flame is reported as afterglow time; if the specimen glows for more than 30 seconds, it is removed from the test cabinet, taking care not to fan the flame, and suspended in a draft-free area in the same vertical position as in the test cabinet. Char length, the distance (in mm) from the end of the specimen which was exposed to the flame, to the end of a lengthwise tear through the center of the charred area to the highest peak in the charred area, is also measured and the results averaged.

FR Federal Test Method 5905, flame contact test is a measurement of the resistance of textiles and other materials to flame propagation that exposes the specimen to the flame source for a longer period of time than test method 5903. A test specimen the same size as in the above method is exposed to a high temperature butane gas flame 3 inches in height by vertical suspension in the flame for 12 seconds, the lowest part of the specimen always 1.5 inches above the center of the burner. At the end of 12 seconds, the specimen is withdrawn from the flame slowly, and any afterflaming timed. The specimen is then re-introduced into the flame and again slowly withdrawn after 12 seconds and any afterflame timed. For each 12-second exposure the results are reported as: ignites, propagates flame; ignites but is self-extinguishing; is ignition resistant; melts; shrinks away from the flame; or drops flaming pieces.

Limiting Oxygen Index (LOI) is a method of measuring the minimum oxygen concentration needed to support candle-like combustion of a sample according to ASTM D-2863-77. A test specimen is placed vertically in a glass cylinder, ignited, and a mixture of oxygen and nitrogen is flowed upwardly through the column. An initial oxygen concentration is selected, the specimen ignited from the top and the length of burning and the time are noted. The oxygen concentration is adjusted, the specimen is re-ignited (or a new specimen inserted), and the test is repeated until the lowest concentration of oxygen needed to support burning is reached.

The invention will be further explained with reference to the following examples in which all parts and percentages are by weight and temperatures reported in degrees Fahrenheit.

EXAMPLE I

A pad bath, consisting of Antiblaze 19 in which 3% Disperse Red 90 (C.I. 11117) was dissolved, was padded onto Nomex fabric at ambient temperature, then heat treated at 390° F. for 60 seconds using a Benz oven. Following heat treatment, the dyed Nomex fabric was scoured with an aqueous detergent, then rinsed with perchloroethylene. Color retention was good and the dyeing was level when the fabric was examined for side-to-side and end-to-end dyeing.

EXAMPLE II

A print paste was made of Disperse Red 90 (3%) and Antiblaze 19; no other ingredients were added. The dry paste that resulted was printed onto Nomex fabric and heat treated in the same manner as in Example I at 380° F. for 60 seconds. After scouring and rinsing, also as in Example I, the dye appeared to be well fixed onto the Nomex fabric.

EXAMPLE III

Example II was repeated, this time using Disperse Blue 56 (CI-63285), and similar results were obtained.

EXAMPLE IV

In the manner of Example I, a pad bath was prepared containing Acid Blue 171 (Acid Blue 3GL-200) and this was padded onto samples of Nomex 455 fabric which was then heat treated at 380° F. for 90 seconds followed by an aqueous detergent scour and rinse. The procedure was repeated using Acid Green 70 (Acid Olive 3BL-131).

The samples thus prepared appeared to have the dyestuff suitably fixed to the fiber. However, the yield was not as great as with the disperse dyes. It is believed that the yield is a function of the solubility of the dye in the fire retardant fluid and that the dyeing mechanism is an equilibrium between the fiber and the fire retardant fluid.

EXAMPLE V

An equal mixture containing 0.33% of Disperse Red 60, 0.33% of Disperse Yellow 54 and 0.33% of Disperse Blue 56 was dissolved in neat Antiblaze 19. The solution was heated to a temperature in the range of 350°–380° F. and samples of Nomex fabric were immersed in the dye solution for periods of from 15 seconds to 2 minutes. The samples were then scoured with an aqueous detergent solution and then rinsed in perchloroethylene. Analysis of the samples indicates that color yield is improved at higher temperatures and with higher dwell times in the heated fluid.

The process of the invention provides a convenient way to dye aramid fibers susceptible to treatment, particularly Nomex fibers, and to impart improved fire-retardancy properties over and above those of the undyed fabric.

EXAMPLE VI

Nomex (T-455) fabric was continuously FR finished and dyed by immersion of the fabric through a hot fluid bath containing neat (undiluted) Antiblaze 19 (AB19) and a disperse dyestuff. The hot neat AB19 and 0.5% of Altasol Blue 3N (Disperse Blue 14, CI-61500, 12.5mg) were dissolved in the bath (2.5g). The bath was heated to 375° F. in an indirect (oil) heated trough and the Nomex fabric was passed through the hot fluid with dyestuff having a dwell time of two minutes in the hot fluid. The fabric was squeezed through the nip of two rubber rolls to approximately 110% wet pickup. The fabric was then thoroughly scoured with hot water (140° F.) and detergent (approximately 0.05% non-ionic detergent). The color yield was observed to be good. Based on phosphorus analysis, the final finished and dyed sample had 3.5% AB19 fixed in the fiber.

The fabric was then examined for its flammability properties and the following data were collected:

| LOI - 0.39 (39%) FTM - 5903 | | | | | |
|---|---|---|---|---|---|
| Warp Direction | | | Fill Direction | | |
| Ave Afterflame | Ave Char | Ave Afterglow | Ave Afterflame | Ave Char | Ave Afterglow |
| 0 | 1.3" | 0 | 0 | 1.3" | 0 |

| FTM - 5905 (Using Natural Gas) | | | | | |
|---|---|---|---|---|---|
| WARP | | | FILL | | |
| Ave 1st Afterflame | Ave 2nd Afterflame | Ave inches Uncharred | Ave 1st Afterflame | Ave 2nd Afterflame | Ave inches Uncharred |
| 0 | 0 | 10.0 | 0 | 0 | 10.0" |

The average percent consumed was 16.7%

As reflected by the above data, the flammability characteristics were very good with an average char length of only 1.3 inches using the FTM-5903 test method. There was no afterglow on the samples which compares to the controls. The consumption in FTM-5905 was only 16.7%. This compares to 25% to 35% for normal Nomex fabrics.

As a control, undyed Nomex fabric (T-455) was examined for flammability and the following results noted:

| LOI . . . 0.273 (27.3%) FTM - 5903 | | | | | |
|---|---|---|---|---|---|
| Warp Direction | | | Fill Direction | | |
| Ave Afterflame | Ave Char | Ave Afterglow | Ave Afterflame | Ave Char | Ave Afterglow |
| 0 | 2.8 | 3 sec. | 0 | 2.5 | 3 sec. |

| FTM - 5903 (Using Natural Gas) | | | | | |
|---|---|---|---|---|---|
| WARP | | | FILL | | |
| Ave 1st After-flame | Ave 2nd After-flame | Ave inches Uncharred | Ave 1st After-flame | Ave 2nd Afterflame | Ave inches Uncharred |
| 6 sec. | 3 sec. | 8.6 | 9 sec. | 1 sec. | 8.4 |

34.2% consumed

EXAMPLE VII

Acid Dyes applied via undiluted fire retardant. Solutions of Acid Blue 3GL 200 (Acid Blue 171) and Acid Olive 3BL 131 (Acid Green 70), both 1%, in AB19 were padded onto T-455 Nomex and heated in a Benz oven at 380? F. for 60 seconds. The samples were then given a hot water scouring. The dyed samples appeared to have good color retention.

EXAMPLE VIII

Disperse Dyes applied via undiluted fire retardant. In a manner similar to Example 1, for comparison, a Nomex sample was also treated with only a 1% solution of Dispersed Dye Red 90 using the same conditions as discussed above. The color retention after scouring was good.

EXAMPLE IX

Acid Dyes. In the manner of Example IV, 3% baths of Acid Blue 171 and Acid Green 70 in AB19 were prepared and heated to 220° F. to insure good dye solubility. The hot dye solutions were applied to the Nomex samples and then passed through a Benz oven at 380° F. for 90 seconds. The samples were given a hot detergent scour and dried. The dyed samples had good color retention.

EXAMPLE X

Application of Acid Dyes via a Fire Retardant. Samples of Nomex were dyed with baths having a dye (2.5% Acid Blue 3GL-200) dissolved in 90/10, 50/50, and 25/75 AB19/water mixtures. All samples were heated in a Benz oven at 350° F. for either 60 or 120 seconds and at 380° F. for either 60 or 120 seconds. The samples were given a hot water scour at 140° F. and then given a process wash in a washing machine. Only the dyed samples which were heated to 400° F. had good color retention.

The surface appearance and hand of the normal processed Nomex fabric is somewhat harsh. It was noted that the treatment with the fire-retardant/solvent system greatly improved the touch of the final finished Nomex fabric.

Grab tensile strengths were obtained to determine the potential strength loss of the fabrics which were dyed and finished, and lightfastness for certain samples were also obtained. The results are reported below:

| | | Tensile Strengths | |
|---|---|---|---|
| AB19/H$_2$O | Temperature/Time | Warp[1] Lbs. | Fill Lbs. |
| 90/10 w/dye[2] | 400 F./60 sec. | 261.5 | 218.7 |
| | 400/120 | 248.5 | 204.3 |
| | 350/60 | 264.2 | 211.8 |
| | 351/120 | 255.7 | 223.3 |
| 90/10 | 350/120 | 260.0 | 213.7 |
| | 400/120 | 258.3 | 202.0 |
| 50/50 w/dye | 350/60 | 264.2 | 226.2 |
| | 350/120 | 267.5 | 232.2 |
| | 400/60 | 258.5 | 211.2 |
| | 400/120 | 262.1 | 211.6 |
| 50/50 | 350/120 | 261.2 | 226.2 |

| | Tensile Strengths | | |
|---|---|---|---|
| AB19/H$_2$O | Temperature/Time | Warp[1] Lbs. | Fill Lbs. |
| | 400/120 | 269.8 | 213.7 |
| 25/75 w/dye | 400/120 | 268.2 | 220.0 |
| | 400/60 | 256.3 | 229.3 |
| | 350/60 | 269.2 | 227.2 |
| | 350/120 | 267.0 | 236.8 |
| 25/75 | 350/120 | 243.0 | 227.5 |
| | 400/120 | 263.3 | 226.0 |
| Control | | 284.8 | 234.4 |

[1] An average of three determinations
[2] Contains 2.5% dye dissolved in the fire retardant

| | Xenon Lightfastness Test | | | |
|---|---|---|---|---|
| AB 19/H$_2$O ratio | Time (min.) | Temperature) | Rating 20 hrs. | Rating 40 hrs. |
| 90/10 | 120 | 350 | 4.5 | 4.0 |
| | 60 | 400 | 4.5 | 4.5 |
| | 120 | 400 | 4.5 | 4.5 |
| 50/50 | 120 | 350 | 4.5 | 4.0 |
| | 120 | 400 | 4.5 | 4.0 |
| 25/75 | 60 | 400 | 4.5 | 4.0 |
| | 120 | 400 | 4.5 | 4.5 |

EXAMPLE XI

Application of Acid Dyes Using Production Type Equipment. A dye formulation was developed for application from a fire-retardant/water mixture that would match the Sage Green shade for the military apparel. This formulation was applied to a plain weave and a twill fabric. The formulation consisted of
2.00% Irgalan Olive Green 2BC
0.20% Nylanthrene Yellow SL2007 (Yellow 198)
0.20% Irgalan Orange P-2R (Acid Orange 154)
dissolved in a 80/20 mixture of AB19/water. The mixture was applied and heated in the manner of Example X; the wet pickup was about 60%. The treated sample was run through the tenter frame at 380° F. for a dwell time of three minutes. Approximately 10 yards of fabric was dyed. After the heat treatment, the fabrics were scoured in 0.5% nonionic detergent and 0.5% soda ash at 180° F. and then hot water rinsed. The following data were collected:

| Flammability Data FTM - 5903 | | | | | |
|---|---|---|---|---|---|
| Warp | | | Fill | | |
| Afterflame | Char | Afterglow | Afterflame | Char | Afterglow |
| plain weave LOI - 0.409 | | | | | |
| 0 | 1.2 | 0 | 0 | 1.2 | 0 |
| 0 | 1.2 | 0 | 0 | 1.1 | 0 |
| 0 | 1.2 | 0 | 0 | 1.2 | 0 |
| 0 | 1.3 | 0 | 0 | 1.1 | 0 |
| twill fabric LOI - 0.434 | | | | | |
| 0 | 1.0 | 0 | 0 | 1.0 | 0 |
| 0 | 1.1 | 0 | 0 | 1.1 | 0 |
| 0 | 1.1 | 0 | 0 | 0.7 | 0 |
| 0 | 1.0 | 0 | 0 | 0.8 | 0 |

The shade was very close to the standard Military Sage Green. The fixation was very good based on observation and crocking and the IIIA Washing Test.

| | Wet Crocking | Dry Crocking |
|---|---|---|
| plain weave | 5.0 | 5.0 |
| twill | 5.0 | 5.0 |

| IIIA Washing Test | | | |
|---|---|---|---|
| Fabric | Nylon | Polyester | Cotton |
| plain weave | 4.5 | 5.0 | 4.5 |
| twill | 4.5 | 4.5 | 4.5 |

What is claimed:
1. A process of simultaneously dyeing and flame retarding an aramid fiber, comprising the steps of:
  (1) contacting dyeable poly(m-phenyleneisophthalamide) fibers or fabric with a solution consisting essentially of a flame-retarding amount of a cyclic phosphonate ester flame retardant represented by the formulae:

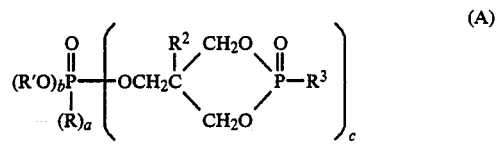

(A)

where a is 0 or 1; b is 0, 1 or 2, c is 1, 2 or 3 and a+b+c is 3; R and R' are the same or different and are alkyl ($C_1$–$C_8$), phenyl, halophenyl, hydroxyphenyl, tolyl, xylyl, benzyl, phenethyl, hydroxyethyl, phenoxyethyl, or dibromophenoxymethyl; $R^2$ is alkyl ($C_1$–$C_4$); and $R^3$ is lower alkyl ($C_1$–$C_4$) or hydroxyalkyl ($C_1$–$C_4$); or

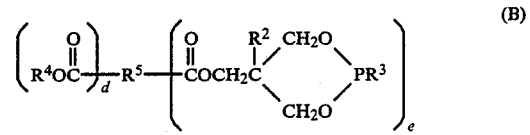

(B)

where d is 0, 1 or 2; e is 1, 2 or 3; $R^2$ is alkyl ($C_1$–$C_4$); $R^3$ is lower alkyl ($C_1$–$C_4$) or hydroxyalkyl ($C_1$–$C_4$), $R^4$ is alkyl ($C_1$–$C_4$) phenyl, halophenyl, hydroxyphenyl, hydroxyethyl, phenoxyethyl, dibromophenoxyethyl, tolyl, xylyl, benzyl, or phenethyl; and $R^5$ is monovalent alkyl ($C_1$–$C_6$), chlorophenyl, bromophenyl, dibromophenyl, tribromophenyl, hydroxyphenyl, naphthyl, tolyl, xylyl, benzyl, or phenethyl; divalent alkylene ($C_1$–$C_6$), vinylene, o-phenylene, m-phenylene, p-phenylene, tetrachlorphenylene (o, m, or p), or tetrabromophenylene (o, m, or p); or trivalent phenyl and a disperse dyestuff, an acid dyestuff or both; and
  (2) heating the aramid fiber treated in step (1) to fix said dye to said fiber.
2. The process of claim 1, in which the solution contains a tinctorial amount of a disperse dye.
3. The process of claim 1, in which the solution contains a tinctorial amount of an acid dye.
4. The process of claim 1, in which the solution is applied by padding onto an aramid fabric.
5. The process of claim 1, in which the flame retardant plus dyestuff are applied as a print paste.
6. The process of claim 1, in which the fiber or fabric is heated in step (2) at a temperature in the range of about 350° F. to about 400° F.

7. The process of claim 1, in which the fiber or fabric is heated in step (2) for a period of from about 30 seconds to about 2 minutes.

8. The process of claim 6, in which the fiber or fabric is heated in step (2) for a period of from about 30 seconds to about 2 minutes.

9. A process of dyeing and imparting a flame retardant treatment to a dyeable aramid fiber, comprising the successive steps:

(1) contacting a dyeable poly(m-phenyleneisophthalamide) fiber with a solution consisting essentially of a flame-retarding amount of a cyclic phosphonate ester flame retardant represented by the formulae:

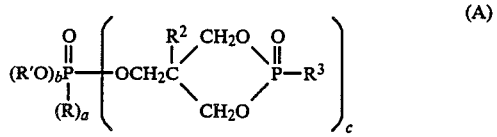

where a is 0 or 1; b is 0, 1 or 2, c is 1, 2 or 3 and a+b+c is 3; R and R' are the same or different and are alkyl ($C_1$–$C_8$), phenyl, halophenyl, hydroxyphenyl, tolyl, xylyl, benzyl, phenethyl, hydroxyethyl, phenoxyethyl, or dibromophenyoxymehtyl; $R^2$ is alkyl ($C_1$–$C_4$); and $R^3$ is lower alkyl ($C_1$–$C_4$) or hydroxyalkyl ($C_1$–$C_4$); or

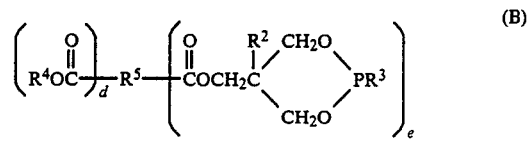

where d is 0, 1 or 2; e is 1, 2 or 3; $R^2$ is alkyl ($C_1$–$C_4$); $R^3$ is lower alkyl ($C_1$–$C_4$) or hydroxyalkyl ($C_1$–$C_4$); $R^4$ is alkyl ($C_1$–$C_4$) phenyl, halophenyl, hydroxyphenyl, hydroxyethyl, phenyoxyethyl, dibromophenoxyethyl, tolyl, xylyl, benzyl, or phenethyl; and $R^5$ is monovalent alkyl ($C_1$–$C_6$), chlorophenyl, bromophenyl, dibromophenyl, tribromophenyl, hydroxyphenyl, naphthyl, tolyl, xylyl, benzyl, or phenethyl; divalent alkylene ($C_1$–$C_6$), vinylene, o-phenylene, m-phenylene, p-phenylene, tetrachlorphenylene (o, m, or p), or tetrabromophenylene (o, m, or p); or trivalent phenenyl and a disperse dyestuff, an acid dyestuff or both, the solution being maintained at a temperature of from about 300° F. to a temperature not greater than the boiling point of the solution;

(2) allowing the fiber to remain in contact with the solution until the dye is fixed to the fiber; and (3) removing and drying the dyed and flame-retardant-treated fiber.

10. The process of claim 9, in which the solution is maintained at a temperature in the range of about 350° to about 400° F.

11. The process of claim 10, in which the fiber is in contact with the heated solution for from about 15 seconds to about 2 minutes.

12. The process of claim 10, in which the dyestuff is a disperse dye.

13. The process of claim 10 in which the dyestuff is an acid dye.

* * * * *

UNITED STATES PATENT AND TRADEMARK OFFICE
CERTIFICATE OF CORRECTION

PATENT NO. : 4,752,300

DATED : June 21, 1988

INVENTOR(S) : JOHNSON

It is certified that error appears in the above-identified patent and that said Letters Patent is hereby corrected as shown below:

Column 3 line 16 "ylene" should correctly read --vinylene--

Column 10 line 53 "phenyl" should correctly read --phenenyl--

Signed and Sealed this

Tenth Day of July, 1990

Attest:

HARRY F. MANBECK, JR.

*Attesting Officer*      *Commissioner of Patents and Trademarks*